July 7, 1925.

S. E. W. HAINES 1,544,836

LIGHT PROJECTOR

Filed April 10, 1922

INVENTOR.
Samuel E. W. Haines
BY M. C. Frank
ATTORNEY

Patented July 7, 1925.

1,544,836

UNITED STATES PATENT OFFICE.

SAMUEL E. W. HAINES, OF BERKELEY, CALIFORNIA.

LIGHT PROJECTOR.

Application filed April 10, 1922. Serial No. 551,045.

*To all whom it may concern:*

Be it known that I, SAMUEL E. W. HAINES, a citizen of the United States, residing at 2812 California Street, in the city of Berkeley, county of Alameda, and State of California, have invented certain new and useful Improvements in Light Projectors, of which the following is a specification.

This invention relates to light projectors and in particular to an advertising and display apparatus, in which light from incandescent carbons is projected and focussed on a screen, a cloud, a bank of fog, steam, or other medium, and showing thereon an image of the incandescent tips or faces of the carbons. These carbons are preferably shaped in cross-section to the form of the design to be shown, be it letter, figure, symbol, or other character. The light rays may be projected and focussed by means of a lens or lenses, or by means of a reflector.

Figure 1:
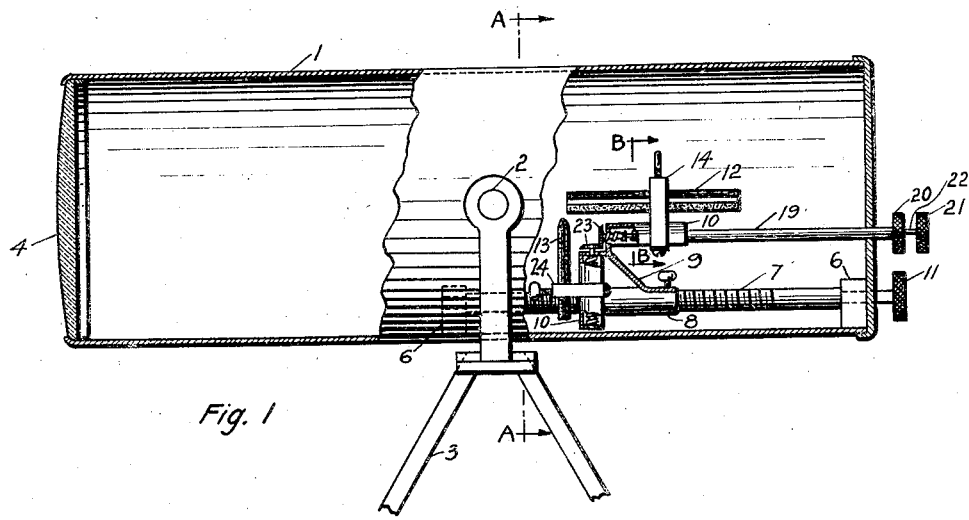
Figures 2, 3, 5:
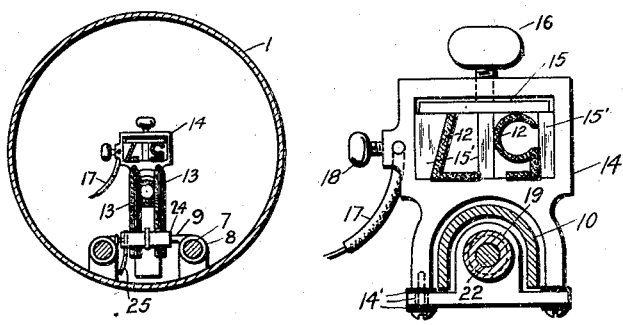
Figure 4:
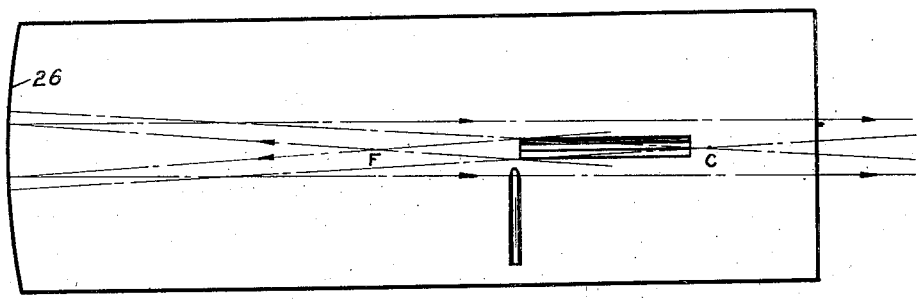

The means of accomplishing the foregoing, and the details of the apparatus, are set forth in the subjoined description, and illustrated in the accompanying drawing, in which:

Figure 1 is a side elevation partly in section, showing the projector and a portion of the support therefor, and Fig. 2 is a cross-section of Fig. 1 taken on the line A—A. Fig. 3 is an enlarged cross-section of the carbons and portion of the feeding mechanism taken on the line B—B of Fig. 1. Fig. 4 is a view similar to Fig. 1, showing the projector in the form of a reflector, the whole figure being diagrammatic. Fig. 5 shows the image focussed on a cloud bank.

In the figures:—1 is the tube of the projector mounted on trunnions 2, and supported by stand 3, and provided with a focussing lens 4, the trunnions adapting the device to be turned through a vertical angle.

Short standards 6 on the interior bottom of the projector tube serve to support one or more threaded guide bars 7, and upon which the focus adjusting mechanism for the projector is mounted.

This mechanism consists of sleeves 8 cast integral with bracket 9 and with the two carbon-holder supports 10. 11 is a hand wheel for turning the threaded guide-bar 7 which adjusts the entire mechanism to and fro for focusing. Thus the light developing means may be adjusted longitudinally in the projector tube to suit conditions.

The longitudinal carbons 12, are in the present instance, which is selected for illustration, two in number, one having a cross-section in shape of the figure 5, and the other in the shape of the figure 7. The co-acting carbons 13 may be plain pencils, and of any desired number. Both sets of carbons may be similarly held in their respective carbon-holders as shown in Figure 3, and which shows more particularly the character carbons 12 in position. These holders are in the form of a yoke 14, and insulated from the body of the adjusting mechanism by the insulation pieces 14'. When the carbons are more than one in number, a bar 15 may be provided and pressed against them by a screw 16, so that they are firmly held for effective contact with the current conduction. A wire 17 and binding screw 18 serve for connection to yoke 14 with the electric main. The carbon-holder yoke is adjusted longitudinally by a screw shaft 19, operated by the milled knob 20 for feeding the carbons as consumed. A second milled knob 21 rotates a shaft 22, within shaft 19, which, through a pair of bevel gears 23, operates the yoke 24 of the carbons 13, and which yoke is similarly supported and its carbons similarly fed. 15' are separating spacers for the carbons.

In operation, and in this instance, an electric current is passed through the wires 17 and 25, developing heat to incandescence at the ends of the carbons. Direct current is preferably used, because of the predominating volume of light emanating from the positive carbons 12. The light rays from these carbons are focussed and projected by the lens 4, and a magnified image is formed of the incandescent ends of carbons 12 on the surface desired, and in accordance with well known optical principles, which require no elucidation here.

In the diagrammatic view shown in Fig. 4, the projector tube is formed with an open end and a closed end, the latter end being spherical and its inner surface prepared for a reflector 26. F is its principal focus and C its center of curvature, and the dot and dash lines represent light rays emanating from the longitudinal carbons and reflected by the reflector, the image of the said carbons being formed on a distant screen.

While I have described the members 12 and 13 as carbons and as being the source of illumination, they may of course be composed of other suitable material such as lime or other compounds of calcium. In Fig. 4 the horizontal members may be such poles, and the vertical members may be the oxyhydrogen jet, and its flame capable of being directed on the faces of the lime poles, inducing such high temperatures that incandescence results. The adjusting apparatus functions equally as well with the lime poles as with the carbon poles.

By reason of the incandescent faces of the horizontal carbons emanating a far more intense light than the arcing or jet flame, the light rays from the said carbons register the image of its face formation, while the light rays from the flame fail to reach the distant screen because of their unequal intensity of illumination.

Having described my invention, what I claim as new and desire to secure by Letters Patent of the United States, is the following:

1. An advertising device, comprising in combination, a tubular light projector mounted on trunnions for vertical-angle movement, light producing means having a cross-section in the form of a symbol and adapted to present the face of said symbol in incandescent condition, and means for focussing the light from said incandescent symbol at a distance, such as on a cloud or bank of fog.

2. An advertising device, comprising, in combination, a tubular light projector, light producing means composed of a horizontally positioned carbon and a vertically positioned one, the former one presenting a desired symbol, and means for focussing the projected light from the symbol on a relatively distant screen.

3. An advertising device, comprising, in combination, a tubular light projector, two sets of light developing carbons, devices for focussing the projected light at a distance, one set of said carbons being longitudinally positioned in said projector, and said set of carbons having a cross-section of the form of the symbol to be projected.

4. An advertising device, comprising, in combination, a light projector, two sets of carbons mounted therein and adapted to develop a light, one set of said carbons being of symbolic cross-section and positioned longitudinally, and the other set being of plain cross-section and positioned laterally of said projector, and means for adjusting the distance apart of said sets.

5. An advertising device, comprising a light projector, a carbon having a cross-section in the form of a desired character, and said carbon adapted to receive a source of energy causing an extremity to become incandescent, and means for focussing the projected light from said incandescent extremity on a distant object.

6. In a light projecting apparatus, a carbon having a cross-section in the form of a letter, figure or other symbol, and adapted to present an incandescent end face induced by a source of energy.

7. In a light projector, an arc-light including a terminal with its incandescent end shaped to form a desired outline in the nature of a letter, figure or other symbol, and means for forming a magnified image of such outline.

8. In a light projector, an arc-light including a terminal having its incandescent end shaped in the form of a letter, figure or other symbol for magnification and display purposes.

9. In a light projector, an arc-light having a positive and a negative pole, the light from the positive pole predominating, means for focusing the light from said positive pole, and means for varying the positions of said poles with respect to such focusing means, the positive pole having its incandescent end shaped to form a desired outline for magnification and display upon a distant screen.

SAMUEL E. W. HAINES.